United States Patent [19]

Hayashida et al.

[11] Patent Number: 5,346,944
[45] Date of Patent: Sep. 13, 1994

[54] POLYOLEFIN RESIN COMPOSITION

[75] Inventors: Haruo Hayashida, Chiba; Ryoichi Nomura, Ichihara; Satoru Koyama, Sodeqaura, all of Japan

[73] Assignee: Sumitomo Chemical Company, Limited, Osaka, Japan

[21] Appl. No.: 26,096

[22] Filed: Mar. 4, 1993

Related U.S. Application Data

[63] Continuation of Ser. No. 806,218, Dec. 13, 1991, abandoned.

[30] Foreign Application Priority Data

Dec. 21, 1990 [JP] Japan .................. 2-405105
Dec. 21, 1990 [JP] Japan .................. 2-405106
Dec. 21, 1990 [JP] Japan .................. 2-405107

[51] Int. Cl.$^5$ .......................... C08K 3/34; C08K 5/13; C08K 5/49
[52] U.S. Cl. ........................ 524/451; 524/101; 524/128; 524/223; 524/306; 524/313; 524/311; 524/445; 524/448
[58] Field of Search ............... 524/451, 101, 313, 311, 524/306, 223, 128, 445, 448

[56] References Cited

U.S. PATENT DOCUMENTS

| | | | |
|---|---|---|---|
| 3,206,429 | 9/1965 | Broyles et al. | 524/223 |
| 3,321,455 | 5/1967 | Guillet et al. | 524/223 |
| 3,365,437 | 1/1968 | Marra et al. | 524/223 |
| 3,558,537 | 1/1971 | Hecker et al. | 524/306 |
| 3,639,518 | 2/1972 | Davies et al. | 524/223 |
| 3,644,310 | 2/1972 | Hopkins | 524/223 |
| 4,124,562 | 11/1978 | Yui et al. | 524/427 |
| 4,174,340 | 11/1979 | Luders et al. | 524/424 |
| 4,363,885 | 12/1982 | Fukui et al. | 524/451 |
| 4,381,356 | 4/1983 | Marsh | 524/451 |
| 4,394,474 | 7/1983 | McKinney et al. | 524/445 |
| 4,430,289 | 2/1984 | McKinney et al. | 524/445 |
| 4,454,272 | 6/1984 | McKinney et al. | 524/451 |
| 4,480,065 | 10/1984 | Kawai et al. | 524/451 |
| 4,486,552 | 12/1984 | Niemann | 524/313 |
| 4,487,810 | 12/1984 | Ascarelli et al. | 524/450 |
| 4,493,918 | 1/1985 | Meyer et al. | 524/451 |
| 4,507,423 | 3/1985 | Sasaki et al. | 524/451 |
| 4,686,257 | 8/1987 | Mitsuno et al. | 524/451 |
| 4,739,000 | 4/1988 | Burton | 524/128 |
| 4,764,546 | 8/1988 | Mitsuno et al. | 524/451 |
| 4,785,042 | 11/1988 | Azuma et al. | 524/444 |
| 4,897,437 | 1/1990 | McKinney et al. | 524/451 |
| 4,963,605 | 10/1990 | Fukui et al. | 524/436 |
| 4,985,479 | 1/1991 | Nagasaki et al. | 524/128 |
| 4,985,480 | 1/1991 | Fukui et al. | 524/236 |
| 5,098,939 | 3/1992 | Sienkowski et al. | 524/224 |
| 5,137,955 | 8/1992 | Tsuchiya et al. | 524/313 |
| 5,187,012 | 2/1993 | Takahashi et al. | 524/323 |
| 5,202,193 | 4/1993 | Sumi et al. | 428/316.6 |
| 5,206,273 | 4/1993 | Chen et al. | 524/224 |

FOREIGN PATENT DOCUMENTS

| | | |
|---|---|---|
| 21522 | 12/1986 | Austria . |
| 2735160 | 8/1977 | Fed. Rep. of Germany . |
| 62-062843 | 3/1986 | Japan . |
| 61-281142 | 12/1986 | Japan . |
| 61-281143 | 12/1986 | Japan . |
| 64-043546 | 2/1989 | Japan . |

*Primary Examiner*—Paul R. Michl
*Assistant Examiner*—Olga Asinovsky
*Attorney, Agent, or Firm*—Stevens, Davis Miller & Mosher

[57] ABSTRACT

A polyolefin resin composition for a film which consists essentially of a mixture of 100 parts by weight of a polyolefin resin with (a) 0.01-3.0 parts by weight of an antiblocking agent, the surface OH group content of which is 200 µmol/g or less. The resin composition may further contain (b) 0.05-2.0 parts by weight of an antistatic agent consisting of (A) a glycerine fatty acid ester and (B) an alkyldiethanolamide in a weight ratio of A/B of 50/50-95/5 for antistatic film or (c) 0.05-3.0 parts by weight of at least one member selected from the group consisting of polyhydric alcohol fatty acid esters, alkylene oxide adducts of polyhydric alcohol fatty acid esters and higher alcohol-alkylene oxide adducts as an antifogging agent, or (d) 0.01-3.0 parts by weight of a phenol type antioxidant and (e) 0.01-0.2 part by weight of a phosphorous type antioxidant for forming a stabilized film.

4 Claims, No Drawings

POLYOLEFIN RESIN COMPOSITION

This application is a continuation of application Ser. No. 07/806,218 filed Dec.13, 1991 now abandoned.

This invention relates to a polyolefin resin composition enabling the interaction between antiblocking agent and other additives to be inhibited and the original effect of the additives to be fully exhibited.

Polyolefin films are widely used in various fields including packing materials for not only foods but also other articles such as fibers, medicines, fertilizers, sundry goods and the like; covering materials for agriculture and construction; and the like.

Such polyolefin films are compounded with antiblocking agents such as silica, talk, zeolite and the like in order to enhance the workability in handling the films.

In general, polyolefin resin compositions have large insulating resistance, and hence, when they are rubbed, static electricity is easily generated and accumulated. This phenomenon results in attachment of dust to film articles made thereof to impair the appearance of the film articles. In addition, in some cases, when the film articles are contacted with human bodies, a great shock is given to the human bodies. Moreover, this static electricity trouble occurs during film-processing, and generation of electric spark results in disadvantages in aspects of safety, working efficiency and the like.

Therefore, as an antistatic means, a method has been adopted which comprises coating a surfactant having an antistatic ability on the surface of film or mechanically kneading the same into film.

The former method has an immediate effect but the antistatic agent is removed by rubbing, washing or the like to make it difficult to keep the antistatic effect for a long period of time. For keeping the antistatic effect for a long time, the latter method, namely a method of kneading an antistatic agent has generally been used.

Among antistatic agents which are now used in industry, cationic and amphoteric antistatic agents are superior in antistatic effect but inferior in thermal stability, and when a resin composition containing such an antistatic agent is molded, the commercial value of the resulting molded article is greatly impaired by discoloration. Anionic antistatic agents are inferior in compatibility with synthetic resins, and hence, are not appropriate for uses in which transparency is required. Nonionic antistatic agents are relatively superior in thermal stability and good in compatibility with synthetic resins, and therefore, are often used. In particular, esters of polyhydric alcohols with higher fatty acids are well known, and a specific example thereof is glycerine monostearic acid ester (referred to hereinafter as GMS).

This type of antistatic agent has a considerable antistatic effect just after molding; however, the antistatic effect is gradually reduced with the lapse of time. In addition, it bleeds out on the surface of the synthetic resin and forms a white powder on the surface (so-called whitening). This gives an undesirable appearance.

This whitening has been known to result from coagulation of GMS, and the known method of preventing this phenomenon is to co-use an amine type antistatic agent to inhibit the coagulation. However, the amine type antistatic agents are known to act on phenol type antioxidants which are often used in polyolefin resins, thereby yellowing the resins.

Thus, polyolefin films have such problems that even if a relatively large amount of an antistatic agent is compounded, no satisfactory antistatic effect is obtained, that static electricity is generated in the steps of processing and printing films, the step of preparing sacks and filling the sacks with contents and the dust attaches to films when final products wrapped with films are placed in a storehouse or in the shop-window. However, the causal relation thereof has not been clear.

Polyolefin films are used as covering materials in plant culture for agriculture or horticulture or as food-wrapping materials. However, since the surfaces of polyolefin films are hydrophobic, and hence, when they are used, for example, as a covering material in plant culture for agriculture or horticulture, a haze appears on the film surface owing to a change in ambient temperature, humidity or the like, and makes the permeation of sun light bad, which causes insufficient germination of seeds and insufficient growth of seedling. Moreover, many waterdrops are formed on the surface of resin owing to raining or fogging and cause the above-mentioned disadvantages. In addition thereto, the waterdrops may fall directly on the young buds thereby damaging them.

When the films are used in wrapping foods, the resulting waterdrops make the film translucent, which causes the contents not to be seen and causes the freshness of contents to be misjudged bad. Accordingly, when it is intended to use films in such applications, an antifogging agent having a hydrophilic group is compounded to prevent the film surface from being fogged.

However, even if a considerable amount of an antifogging agent is compounded with a polyolefin film, a satisfactory antifogging effect is not obtained, and waterdrops are in some cases attached to the surface of film to cause a haze. The causal relation thereof has not been known.

When a phenol type antioxidant, for example, 2,6-di-t-butyl-4-hydroxytoluene (BHT) is added to the resin in order to inhibit a change such as degradation, crosslinking or the like during the processing, it is well-known that the resin is yellowed when the resin is stored for a long period of time, and it is also known that a phosphorus type stabilizer is co-used to prevent the yellowing.

In, for example, Japanese Patent Application Kokoku No. 56-25935, a method is disclosed by which a specific organophosphite compound is used along with an alkyl-substituted monophenol type stabilizer. However, the prevention effect thereof cannot be said to be satisfactory, and it is common to those skilled in the art that yellowing is caused depending upon ambient conditions and the like.

When, for example, BHT is used it is known that BHT itself is oxidized for preventing the degradation of polyolefin, and consequently, the yellowing is caused by the resulting carbonyl compound having a conjugated double bond as in a quinone structure or stilbenequinone structure, and yellowing is caused even if it is in a very slight amount because it has a very great extinction coefficient.

The commercial value of the yellowed film is low, so that the prevention of yellowing has a very important significance in practice.

It is known that even if an antioxidant as mentioned above is compounded with a polyolefin film, there are some cases where the original effect of the antioxidant is not exhibited and rather various undesirable phenomena are caused. In the case of, for example, a crosslinking type polymer such as polyethylene, the polymer is crosslinked during the molding to often cause fish eyes, and in the case of degradation type polymer such as polypropylene, the polymer degrades during the molding to cause fuming or stripe-like blotches on the film, whereby the mechanical strength of film is reduced. However, the actual state is that the cause therefor has not been clarified in many cases.

In view of the above circumstances, the problem which the present invention intends to solve is to provide a polyolefin resin composition which is excellent in antiblocking property and can sufficiently exhibit the original effects of an additive such as antistatic property, antifogging property, thermal stability during molding and the like.

The present inventors have made extensive research thereon, and based on the obtained knowledge, discovered that when the amount of OH group on the surface of antiblocking agent exceeds 200 μmol/g an antistatic agent and an antifogging agent are adsorbed on the antiblocking agent surface by an action which seems to result from hydrogen bond, and the degree of freedom of molecular motion is restricted during and after the film-formation, whereby the diffusion and transfer of these additives to the film surface are remarkably disturbed and it becomes difficult for the antistatic agent or antifogging agent to exhibit their effects, and that even in the case of an antioxidant, the antioxidant is adsorbed on the antiblocking agent surface by an action which seems to result from hydrogen bond and the degree of freedom of molecular motion is restricted during the molding, whereby the radical-capturing ability of polymer is greatly disturbed and the effect as an antioxidant cannot be exhibited, it has been found that it is necessary for the antiblocking agent to have a surface OH group in an amount of 200 μmol/g or less.

Moreover, the present inventors have made further extensive research on interaction between antiblocking agent and antioxidant, and have consequently found that when the cumulative amount of acids having a solid acid acidity pKa of 4.8 or less of the antiblocking agent is 250 μmol/g or more, the hydrolysis of the antioxidant, particularly phosphorus type antioxidant can be inhibited and the inhibition of oxidation and discoloration can be achieved more effectively.

In addition, it has been found that when an antistatic agent consisting of a glycerine fatty acid ester (component A) and an alkyldiethanolamide (component B) in a weight ratio of A to B of 50:50 to 95:5 is used as an antistatic agent free from amine component which is a material causing the discoloration, aggregation after bleeding is hardly caused and a good antistatic effect is obtained.

Furthermore, it has been found that at least one member selected from the group consisting of polyhydric alcohol-fatty acid esters, alkylene oxide adducts of polyhydric alcohol-fatty acid esters and higher alcohol-alkylene oxide adducts has a good antifogging effect.

According to this invention, there is provided a polyolefin resin composition consisting essentially of a mixture of 100 parts by weight of a polyolefin resin with (a) 0.01–3.0 parts by weight of an antiblocking agent, the surface OH group content of which is 200 μmol/g or less.

This invention further provides a polyolefin resin composition for an antistatic film, which consists essentially of a mixture of 100 parts by weight of a polyolefin resin with (a) 0.01–3.0 parts by weight of an antiblocking agent, the surface OH group content of which is 200 μmol/g or less, and (b) 0.05–2.0 parts by weight of an antistatic agent consisting of (A) a glycerine fatty acid ester and (B) an alkyldiethanolamide in a weight ratio of A/B of 50/50 to 95/5.

This invention further provides a polyolefin resin composition for antifogging film, which consists essentially of a mixture of 100 parts by weight of a polyolefin resin with (a) 0.01–3.0 parts by weight of an antiblocking agent, the surface OH group content of which is 200 μmol/g or less, and (c) 0.05–3.0 parts by weight of at least one member selected from the group consisting of polyhydric alcohol fatty acid esters, alkylene oxide adducts of polyhydric alcohol fatty acid esters and higher alcohol-alkylene oxide adducts as an antifogging agent.

This invention also provides a polyolefin resin composition for forming a stabilized film, which consists essentially of a mixture of 100 parts by weight of a polyolefin resin with (a) 0.01–3.0 parts by weight of an antiblocking agent, the surface OH group content of which is 200 μmol/g or less, (d) 0.01–3.0 parts by weight of a phenol type antioxidant and (e) 0.01–0.2 part by weight of a phosphorus type antioxidant.

The polyolefin resin to be used in this invention includes polyethylene resin, polypropylene resin and polymers such as polybutene-1, poly-4-methylpentene-1, decene-1-4-methylpentene-1 copolymer and the like.

The polyethylene resin includes low density polyethylene, medium density polyethylene, high density polyethylene, ethylene-α-olefin copolymers such as ethylene-propylene copolymer, ethylene-butene-1 copolymer, ethylene-4-methylpentene-1 copolymer, ethylene-hexene-1 copolymer, ethylene-octene copolymer, ethylene-decene-1 copolymer and the like; and copolymers of ethylene with a comonomer such as acrylic acid, methacrylic acid, vinyl acetate, a polysaturated compound such as a conjugated diene, a non-conjugated diene or the like. These polymers may be modified with an acid such as an α,β-unsaturated carboxylic acid, an alicyclic carboxylic acid or a derivative thereof, including graft copolymers, rubbery copolymers and waxy copolymers.

The polypropylene resin includes polypropylene, propylene-4-methylpentene-1 copolymer, propylene-butene-1 copolymer, propylene-ethylene-butene-1 copolymer and the like.

Among the above polyolefin resins, copolymers of ethylene with α-olefins having 4–10 carbon atoms are preferred because they require a large amount of antiblocking agent and hence a remarkable effect thereof is recognized.

The antiblocking agent to be used in this invention [component (a)] includes silica, clay, talc, diatomaceous earth, feldspar, kaolin, zeolite, kaolinite, wollastonite, cericite, amorphous aluminosilicate, amorphous calcium silicate and the like, which have a surface OH group content of 200 μmol/g or less. In particular, when an antioxidant is used, it is essential that the cumulative amount of acids having a solid acid acidity pKa of 4.8 or less on the surface of the antiblocking agent is 250 μmol/g or less.

The surface OH group content is measured by the following method: An antiblocking agent is vacuum-dried at 120° C. for 2 hours and allowed to stand in a silica gel desiccator to be cooled to room temperature, after which about 2 g of the antiblocking agent sample was weighed and then placed in a dried 100-ml, threenecked flask, to which 40 ml of dehydrated toluene is added. The system is purged with a dried $N_2$ gas and thereafter a 11% by vol. toluene solution of triethylaluminum is added with stirring with a magnetic stirrer, after which the amount of the ethane gas generated by reaction of the OH group on the surface of the antiblocking agent with the triethylaluminum is determined, and the surface OH group content is calculated from the following equation:

$$n = PV/RTW$$

wherein n is the surface OH group content (mol/g), P is the pressure (atm), V is the amount of ethane generated (liter), R is the gas constant (atm·liter/mol·°K.), T is the temperature (°K.) and W is the sample weight (g).

The solid acid acidity pKa on the surface is determined by calcining an antiblocking agent at 150° C. for 3 hours, allowing the antiblocking agent to be cooled in a silicagel desiccator to room temperature, allowing it to be adsorbed on n-butylamine according to the Benesi method and using a Hammett's indicator.

The amount of the antiblocking agent (a) is required to be 0.01–3.0 parts by weight per 100 parts by weight of polyolefin resin. When the added amount is less than 0.01 part by weight, the antiblocking property of film cannot be improved and when it exceeds 3.0 parts by weight, the transparency is reduced.

In view of antiblocking effect and transparency, it is preferable that the antiblocking agent has an average particle size of 0.3–8 $\mu$ and contains at least 5% by vol. of particles having a particle size of 10 $\mu$ or more. The average particle size means a value obtained by measuring, by means of a Coulter counter, antiblocking agent particles dispersed in an electrolytic solution by ultrasonic for 2 minutes.

In this invention, the glycerine fatty acid ester which is the component A of the antistatic agent (b) includes, for example, glycerine monostearate (GMS), glycerine monoheptadecilate, glycerine monolaurate, glycerine monocaprate, glycerine monoperalgonate and the like. In addition to the monofatty acid esters, diesters and triesters may be used. The alkyldiethanolamide (B) includes stearyldiethanolamide, lauryldiethanolamide, oleyldiethanolamide and the like.

The weight ratio of the component A to the component B (A/B) in the antistatic agent (b) specified in the present invention is 50/50 to 95/5. When the A/B ratio is less than 50/50, the antistatic effect becomes insufficient. When it exceeds 95/5, aggregation of the component A occurs. Therefore, the weight ratio of the component A to the component B (A/B) is required to be 50/50 to 95/5.

When the amount of the antistatic agent added is less than 0.05 part by weight the antistatic effect is insufficient and when it exceeds 2.0 parts by weight the transparency of film is impaired by whitening resulting from bleeding of the antistatic agent to the film surface, and sticking is caused, resulting in deterioration of antiblocking property. Therefore, the amount of the antistatic agent added is required to be 0.05–2.0 parts by weight per 100 parts by weight of the polyolefin resin. Incidentally, if necessary, a higher aliphatic alcohol or the like may be used with the antistatic agent.

The antifogging agent (c) to be used in this invention is selected from the fatty acid esters of polyhydric alcohols, alkylene oxide adducts of fatty acid esters of polyhydric alcohols and higher alcohol-alkylene oxide adducts, and these may be used alone or in admixture of two or more.

The polyhydric alcohols of the fatty acid esters of polyhydric alcohols include ethylene glycol, propylene glycol, 1,3-butylene glycol, glycerine, diglycerine, triglycerine, tetraglycerine, sorbitane, sorbitol, pentaerithritol, dipentaerithritol, diethylene glycol, triethylene glycol, dipropylene glycol, mannitol, glycose and the like. The fatty acids include n-octanoic acid, iso-octanoic acid, nonanoic acid, decanoic acid, lauric acid, myristic acid, palmitic acid, iso-palmitic acid, stearic acid, behenic acid, 12-hydroxystearic acid, oleic acid, ricinoleic acid, linolenic acid, linoleic acid and the like. An organic dibasic acid or acidic aminoacid may be substituted for the fatty acid. The organic dibasic acids and acidic aminoacids include succinic acid, glutamic acid, adipic acid, suberic acid, azelaic acid, sebacic acid, alkenylsuccinic acid, dimeric acid, glutamic acid, aspartic acid and the like.

The alkylene oxide adducts include adducts of ethylene oxide, propylene oxide, butylene oxide and the like.

The higher alcohol of the higher alcohol-alkylene oxide adducts may be saturated or unsaturated alcohols having at least 6 carbon atoms.

When the amount of the antifogging agent (c) added is less than 0.05 part by weight per 100 parts by weight of polyolefin resin, the antifogging effect is unsatisfactory, and when it exceeds 3.0 parts by weight, the transparency of film is impaired and the stickiness of the surface becomes great, so that the amount is required to be 0.05–3.0 parts by weight.

The phenol type antioxidant (d) to be used in this invention includes, for example, 2,6-di-t-butyl-4-methylphenol, tris(3,5-di-t-butyl-4-hydroxybenzyl) isocyanurate (Irganox 3114 manufactured by Ciba-Geigy Corp.), 2,2'-methylenebis(4-ethyl-6-t-butylphenol), n-octadecyl-3-(3',5'-di-t-butyl-4'-hydroxyphenyl) propionate (Irganox 1076 manufactured by Ciba-geigy Corp.), 4,4'-thio-bis(3-methyl-6-t-butylphenol), tetrakis[methylene-3-(3',5'-di-t-butyl-4'-hydroxyphenyl) propionate]methane (Irganox 1010 manufactured by Ciba-Geigy Corp.), 4,4'-butylidenebis(3-methyl-6-t-butylphenol), 2,2'-methylenebis(4-methyl-6-t-butylphenol), N,N'-hexamethylenebis-(3,5-di-t-butyl-4-hydroxyhydrocinnamide) (Irganox 1098 manufactured by Ciba-Geigy Corp.), triethylene glycol-bis[3-(3'-t-butyl-5'-methyl-4-hydroxyphenyl) propionate], a mixture of bis(ethyl 3,5-di-t-butyl-4-hydroxybenzylphosphonate)calcium and PE wax (weight ratio of 1:1) and the like.

When the amount of the phenol type antioxidant (d) added is less than 0.01 part by weight per 100 parts by weight of polyolefin resin, the oxidation inhibiting effect is not exhibited. When it exceeds 0.3 part by weight, yellowing in a long term storage is accelerated, the transparency is impaired by bleeding of the antioxidant to the film surface and the blocking property is deteriorated. Therefore, the amount is required to be 0.01–0.3 part by weight.

The phosphorus type antioxidant (e) includes, for example, trimethyl phosphite, tri-n-butyl phosphite, tridecyl phosphite, tris(2-ethylhexyl) phosphite, trinonyl phosphite, tricetyl phosphite, dilauryl hydrogenphosphite, tricyclohexyl phosphite, triphenyl phosphite, tribenzyl phosphite, tricrezyl phosphite, tri-p-nonylphenyl phosphite, tris(2,4-di-t-butylphenyl) phosphite, tris(4-α-methylbenzylphenyl) phosphite, tris(octylthioethyl) phosphite, tris(octylthiopropyl) phosphite, tris(crezylthiopropyl) phosphite, tris(3,5-di-t-butyl-4- hydroxyphenyl) phosphite, tetraphenyldipropyl glycol diphosphite, 4,4′-butylidenebis(3-methyl-6-t-butylphenyl-ditridecyl) phosphite, 1,1,3-tris(2-methyl-4-ditridecyl phosphite-5-t-butylphenyl)butane, bis(2-chloropropyl)pentaerithritol diphosphite, bisstearylpentaerithritol diphosphite, trilauryl trithiophosphite, tetrakis(2,4-di-t-butylphenyl)-4,4′-biphenylene diphosphite and the like.

When the amount of the phosphorus type antioxidant added is less than 0.1 part by weight per 100 parts by weight of the polyolefin resin, neither oxidization inhibiting effect nor anti-yellowing effect are exhibited, and when it exceeds 0.3 part by weight, a fear of corrosion of black spec or metal is increased. Therefore, the amount is required to be 0.01–0.2 part by weight.

In order to produce the polyolefin resin composition of this invention, the following methods can be adopted: a method which comprises mixing the polyolefin resin with the antiblocking agent (a) and the additives (b) to (e) in the above-specified amounts in a known manner, for example, by means of a tumbler-blender, Henschel mixer or the like; or a method comprising melt-kneading and pelletizing the resulting mixture in a single-screw extruder, multi-screw extruder or the like or a method comprising melt-kneading and pelletizing the above components in a kneader, Banbury mixer or the like.

Alternatively, it is possible to mix pellets obtained by melt-kneading and pelletizing the polyolefin resin with the antiblocking agent (a), with pellets obtained separately by melt-kneading and pelletizing the polyolefin resin and the additives (b) to (e) in such proportions as to fall within the ranges mentioned above.

The polyolefin resin composition of this invention can be made into a blown film having good physical properties by blown film processing with a conventional air-cooling, two-step air-cooling, or water-cooling, or T-die film processing or the like.

This invention is illustrated below referring to Examples and Comparative Examples. However, the Examples are merely by way of illustration and not by way of limitation.

In the Examples and Comparative examples, the measurements of properties are conducted by the following methods:

(1) Antistatic property

A sample was prepared by molding, stored at room temperature for 1 week, and thereafter subjected to such conditions that the temperature was 23°±2° C. and the relative humidity was 50±5%, for at least 16 hours to control the sample conditions. Thereafter, the surface resistance was measured using an ultra megohmmeter (Model SM-10E) manufactured by Toa Denpa Kogyo K. K. Subsequently, the surface resistivity ($\rho s$) was calculated from the following equation stated in JIS-K691:

$$\rho s = \pi(D+d)Rs/(D-d)$$

wherein $\rho s$ is a surface resistivity ($\Omega$), d is the outer diameter of inner circle of surface electrode (cm), D is an inner diameter of circular electrode on the surface (cm), Rs is a surface resistance ($\Omega$) and $\pi$ is the ratio of the circumference of a circle to its diameter (3.14).

(2) Discoloration resistance

A sheet having a thickness of 2 mm was prepared and placed under such conditions that the temperature was 60° C. and the relative humidity was 90%, for 2 weeks and then the yellow index (YI) was measured (JIS K7103). The lower the value of YI the better.

(3) Initial antifogging property (low temperature antifogging property) Film samples having a size of about 10 cm×30 cm were prepared and then arranged and installed at an inclination angle of 5° about 10 cm above the water surface in an upper-part-opened water tank in which the water temperature was kept at 10° C. The upper part of water tank was covered and the water tank was placed in a constant temperature room kept at 5° C. and the antifogged state (state of flowing of waterdrops) of the film was observed at the predetermined intervals.

◎: Waterdrops flowed down on the film without attaching to the film, so that the water surface in the water tank was well observed.

: Waterdrops flowed down on the film, but the flowing of waterdrops was somewhat slow.

Δ: Waterdrops were attached partly to the film, the flowing of waterdrops was partial, and the water surface in the water tank was not observed at places in which waterdrops were attached to the film.

x : Waterdrops were attached throughout the film and the water surface in the water tank was hardly seen.

(4) Durability of antifogging property (high temperature antifogging property)

Film samples having a size of about 10 cm×30 cm were prepared and then arranged and installed at an inclination angle of 5° about 20 cm above the water surface in an upper-part-opened water tank in which the water temperature was kept at 40° C., after which the upper part of the water tank was covered. The water tank was placed in a constant temperature room kept at 23° C. and allowed to stand for 12 hours. Thereafter, the water temperature was raised to 60° C. and kept constant, during which the antifogging state (state of flowing of water-drops) was observed. The antifogging property was judged in the same manner as in (3) above.

(5) Thermal stability Fish eyes, fuming and stripe-like roughness formed during the blown film processing were observed, and the thermal stability was judged by relative comparison of the film samples obtained from the same resin under the same molding conditions.

: The above-mentioned bad phenomenon was slight.

Δ: The above-mentioned bad phenomenon was intermediate.

x : The above-mentioned bad phenomenon was much.

Examples 1 to 3 and Comparative Examples 1 to 5

To 100 parts by weight of a resin consisting of 90% by weight of Sumikathene L FA102-0 (MFR=0.8 g/10 min, density=0.925 g/cm$^3$) manufactured by Sumitomo Chemical Co., Ltd. and 10% by weight of Sumikathene F102-0 (MFR=0.35 g/10 min, density=0.922 g/cm$^3$) manufactured by Sumitomo Chemical Co., Ltd. were added 0.4 part by weight of an antiblocking agent having a different surface OH group content, 0.02 part by weight of erucic acid amide, and 0.3 part by weight an antistatic agent (b) consisting of glycerine monostearate (component A) and stearyl-diethanolamide (component B) at a varying weight ratio, and the resulting compound was melt-kneaded in a single-screw extruder to form pellets.

The pellets thus obtained were made into a film by a blown film processing machine of K-40R manufactured In addition, a sheet having a thickness of 2 mm was prepared from the film by a press method and subjected to measurement of a YI value. The results obtained are shown in Table 1.

TABLE 1

|  | Polyolefin resin | Antiblocking agent | | | Antistatic agent (b) Comp. (A)/Comp. (B) weight ratio | Surface resistivity $\rho s$ ($\Omega$) | YI value (—) |
|---|---|---|---|---|---|---|---|
|  |  | Kind | Average particle size ($\mu$) | OH group content ($\mu$mol/g) |  |  |  |
| Example 1 |  | Feldspar | 2.8 | 77 | 70/30 | $1.1 \times 10^{12}$ | 11 |
| Example 2 | Ethylene-butene-1 | Kaolin | 3.0 | 52 | 70/30 | $1.5 \times 10^{13}$ | 13 |
| Example 3 | Copolymer (90) | Silica | 2.1 | 90 | 70/30 | $2.7 \times 10^{12}$ | 15 |
| Comp. Ex. 1 | (FA102-0) | " | 2.1 | 90 | 30/70 | $6.8 \times 10^{15}$ | 13 |
| Comp. Ex. 2 | + | " | 2.1 | 90 | 98/2 | $6.0 \times 10^{14}$ | 12 |
| Comp. Ex. 3 | Low density | Zeolite | 2.4 | 570 | 70/30 | $9.2 \times 10^{14}$ | 12 |
| Comp. Ex. 4 | polyethylene (10) | Silica | 3.5 | 1400 | 70/30 | $4.6 \times 10^{15}$ | 14 |
| Comp. Ex. 5 | (F102-0) | " | 1.8 | 1620 | 70/30 | $6.2 \times 10^{15}$ | 14 |
| Comp. Ex. 6 |  | " | 2.1 | 90 | 70/30 (alkyl-di-etha-nol-amine) | $3.2 \times 10^{12}$ | 29 |
| Example 4 | Crystalline | Alumino-silicate | 1.6 | 70 | 70/30 | $1.8 \times 10^{12}$ | 13 |
| Example 5 | propylene-ethylene | Silica | 2.1 | 90 | 70/30 | $3.7 \times 10^{13}$ | 12 |
| Comp. Ex. 7 | copolymer | " | 2.1 | 90 | 30/70 | $7.5 \times 10^{12}$ | 12 |
| Comp. Ex. 8 |  | " | 2.9 | 1760 | 70/30 | $8.4 \times 10^{15}$ | 14 | by Placo Co., Ltd. provided with a die having a diameter of 125 mm$\phi$ and a lip clearance of 2 mm, at a molding temperature of 200° C. under the condition of BUR=1.8 to obtain a film having a thickness of 50 $\mu$.

The surface resistance of the thus obtained film was measured to determine the surface resistivity. Moreover, a sheet having a thickness of 2 mm was prepared from the film by a press method and the YI value thereof was measured by the above-mentioned accelerated test. The results obtained are shown in Table 1.

Comparative Example 6

The same procedure as in Example 1 was repeated, except that the component B of the antistatic agent was replaced by stearyldiethanolamine, to obtain the results shown in Table 1.

Examples 4 and 5 and Comparative Examples 7 and 8

To 100 parts by weight of crystalline propylene-ethylene copolymer (ethylene content: 3.2% by weight) having a melt flow rate of 7 g/10 minutes and a melting point of 145° C. and having compounded therewith a phenol type antioxidant (d) and calcium stearate were added 0.2 part by weight of an antiblocking agent (b) having a different surface OH group content, 0.1 part by weight of erucic acid amide and 0.3 part by weight of an antistatic agent (b) consisting of glycerine monostearate (component A) and stearyldiethanolamine (component B) at a varying weight ratio, and the resulting compound was melt-kneaded in a single-screw extruder to prepare pellets.

The pellets thus obtained were subjected to T-die film processing by a 50 mm$\phi$ extruder manufactured by Tanabe Plastic Co., Ltd. provided with a coat hanger type T-die having a die width of 400 mm and a lip clearance of 0.7 mm, at a molding temperature of 250° C. at a drawing speed of 20 m/min, to obtain a film having a thickness of 30 $\mu$. The film thus obtained was subjected to measurement of surface resistance to determine the surface resistivity.

Examples 6 to 8 and Comparative Examples 9 and 10

To 100 parts by weight of Evatate H2021F manufactured by Sumitomo Chemical Co., Ltd. (ethylene-vinyl acetate copolymer having a MFR of 1.5 g/10 min and a vinyl acetate content of 15% by weight) were added 0.3 part by weight of an antiblocking agent having a different OH group content and 1.5 part by weight of an antifogging agent (c) consisting of diglycerine distearate and glycerine monostearate at a weight ratio of 70/30, and the resulting compound was melt-kneaded in a single-screw extruder to prepare pellets. The pellets thus obtained were made into a film by a blown film processing machine of K-40R manufactured by Placo Co., Ltd. provided with a die having a diameter of 125 mm$\phi$ and a lip clearance of 0.8 mm, at a molding temperature of 150° C. at BUR of 2.6, to obtain a film having a thickness of 50 $\mu$.

The film thus obtained was subjected to evaluation of antifogging property to obtain the results shown in Table 2.

Examples 9 and 10 and Comparative Examples 11 and 12

To 100 parts by weight of Sumikathene F208-0 manufactured by Sumitomo Chemical Co., Ltd. (low density polyethylene having MFR of 1.5 g/10 min and a density of 0.922 g/cm$^3$) were added 0.15 part by weight of an antiblocking agent having a different surface OH group content and 1.5 parts by weight of an antifogging agent (c) consisting of glycerin distearate and glycerin monostearate at a weight ratio of 70/30, and the resulting compound was melt-kneaded in a single screw extruder to prepare pellets. The pellets thus obtained were made into a film by a blown film processing machine of K-40R manufactured by Placo Co., Ltd. provided with a die having a diameter of 125 mm$\phi$ and a lip clearance of 0.8 mm, at a molding temperature of 180° C. at BUR of 2.6, to prepare a film having a thickness of 50 $\mu$.

The film thus obtained was subjected to evaluation of antifogging property to obtain the results shown in Table 2.

the above-mentioned accelerated test to determine the YI value. The results obtained are shown in Table 3.

TABLE 2

| | Polyethylene resin | Antiblocking agent | | | Low temperature antifogging property (Hr) | | | | High temperature antifogging property (Hr) | | | |
|---|---|---|---|---|---|---|---|---|---|---|---|---|
| | | Kind | Average particle size (μ) | OH group content (μmol/g) | 14 | 24 | 38 | 48 | 48 | 62 | 72 | 86 |
| Example 6 | Evatate H2021F (MFR = 1.5 g/10 min, vinyl acetate content = 15% by weight) | Alumino-silicate | 2.9 | 180 | Δ | ο | ⊚ | ⊚ | ⊚ | ⊚ | ⊚ | ⊚ |
| Example 7 | | Diatomaceous earth | 4.6 | 49 | Δ | ⊚ | ⊚ | ⊚ | ⊚ | ⊚ | ⊚ | ⊚ |
| Example 8 | | Silica | 2.1 | 90 | Δ | ο | ⊚ | ⊚ | ⊚ | ⊚ | ⊚ | ⊚ |
| Comp. Ex. 9 | | " | 3.4 | 630 | x | x | Δ | ο | ⊚ | ο | ο | Δ |
| Comp. Ex. 10 | | " | 2.9 | 1870 | x | x | Δ | ο | ο | ο | Δ | x |
| Example 9 | Sumikathene F208-0 (MFR = 1.5 g/10 min, density = 0.922 g/cm³) | Silica | 5.0 | 20 | Δ | ⊚ | ⊚ | ⊚ | ⊚ | ⊚ | ⊚ | ⊚ |
| Example 10 | | Talc | 2.8 | 100 | Δ | Δ | ο | ⊚ | ⊚ | ⊚ | ⊚ | ⊚ |
| Comp. Ex. 11 | | Zeolite | 2.4 | 570 | x | x | Δ | Δ | ⊚ | ο | Δ | Δ |
| Comp. Ex. 12 | | Alumino-silicate | 5.8 | 3400 | x | x | Δ | Δ | Δ | Δ | Δ | x |

Examples 11 to 13 and Comparative Examples 13 to 18

To 100 parts by weight of an ethylene-butene-1 copolymer having a MFR of 0.8 g/10 min and a density of 0.919 g/cm³ were added 0.2 part by weight of an antiblocking agent having a different surface solid acid acidity and a different surface OH group content, 0.15 part by weight of a phenol type antioxidant (d) consisting of Sumilizer BP76 manufactured by Sumitomo Chemical Co., Ltd. and 0.10 part by weight of a phosphorus type antioxidant (e) consisting of Sandostab P-EPQ manufactured by Sandoz Co., Ltd., and the resulting compound was melt-kneaded in a single screw extruder to prepare pellets. The pellets thus obtained were made into a film by a blown film processing machine of 50 mmφ Ext. manufactured by Tomi Kikai Kogyo K. K. provided with a manispil type die having a diameter of 120 mmφ and a lip clearance of 2 mm, at a molding temperature of 200° C. at BUR of 2.0, to prepare a film having a thickness of 30 μ.

The thermal stability during molding was evaluated. In addition, the film thus obtained was formed into a sheet by a press method and the sheet was subjected to the above-mentioned accelerated test to determine the YI value. The results obtained are shown in Table 3.

Examples 14 to 16 and Comparative Examples 19 to 22

To 100 parts by weight of a propylene-ethylene-butene-1 copolymer having an ethylene content of 2% by weight, a butene-1 content of 6% by weight, a MFR of 5 g/10 min and a melting point of 138° C. were added 0.3 part by weight of an antiblocking agent having a different surface solid acid acidity and a different surface OH group content, 0.1 part by weight of a phenol type antioxidant (d) consisting of Sumilizer BP101, 0.05 part by weight of a phosphorus type antioxidant (e) consisting of PEP-8 manufactured by Adeka Argus Chemical Co., Ltd., and the resulting compound was melt-kneaded in a single screw extruder to prepare pellets. The pellets thus obtained were extruded by means of a 65 mmφ extruder having a screw L/D of 32, manufactured by Sumitomo Heavy Industries, Ltd., provided with a straight manifold type T-die having a die width of 600 mm, a lip clearance of 1.0 mm, at a molding temperature of 230° C. and then cooled and solidified on a cooling roll at 25° C., to prepare a film having a thickness of 50 μ. The thermal stability during molding was evaluated. In addition, the film thus obtained was formed into a sheet having a thickness of 2 mm by a press method. The YI value was determined. The results are shown in Table 3.

TABLE 3

| | Polyolefin resin | Antiblocking agent | | | Thermal stability | | | Discoloration resistance YI value (—) |
|---|---|---|---|---|---|---|---|---|
| | | Kind | Cumulative amount of acid of pKa ≦ 4.8 (μmol/g) | OH group content (μmol/g) | Fish eye | Fuming | Stripe-like roughness | |
| Example 11 | Ethylene-butene-1 copolymer (MFR = 0.8 g/10 min, density = 0.919 g/cm³) | Alumino-silicate | 8 | 83 | ο | ο | ο | 15 |
| Example 12 | | Alumino-silicate | 220 | 90 | ο | ο | ο | 20 |
| Example 13 | | Diatomaceous earth | 5 | 110 | ο | ο | ο | 14 |
| Comp. Ex. 13 | | Silica | 87 | 630 | Δ | Δ | Δ | 25 |
| Comp. Ex. 14 | | " | 730 | 1870 | x | x | x | 33 |
| Comp. Ex. 15 | | " | 130 | 1620 | x | Δ | Δ | 30 |
| Comp. Ex. 16 | | " | 470 | 160 | Δ | x | Δ | 28 |
| Comp. Ex. 17 | | Alumino-silicate | 500 | 590 | x | x | x | 33 |
| Comp. Ex. 18 | | Alumino-silicate | 750 | 3400 | x | x | x | 40 |
| Example 14 | Propylene-ethylene- | Alumino-silicate | 40 | 180 | ο | ο | ο | 18 |

TABLE 3-continued

| | Polyolefin resin | Antiblocking agent Kind | Cumulative amount of acid of pKa ≤ 4.8 (μmol/g) | OH group content (μmol/g) | Thermal stability Fish eye | Fuming | Stripe-like roughness | Discoloration resistance YI value (−) |
|---|---|---|---|---|---|---|---|---|
| Example 15 | butene-1 | Silica | 20 | 90 | ○ | ○ | ○ | 17 |
| Example 16 | copolymer | " | 160 | 110 | ○ | ○ | ○ | 22 |
| Comp. Ex. 19 | (MFR = 5 g/10 min, | Alumino-silicate | 500 | 590 | ○ | x | x | 28 |
| Comp. Ex. 20 | melting | Silica | 470 | 160 | ○ | x | Δ | 26 |
| Comp. Ex. 21 | point = | " | 140 | 730 | ○ | Δ | Δ | 33 |
| Comp. Ex. 22 | 138° C.) | " | 130 | 1620 | ○ | Δ | Δ | 24 |

What is claimed is:

1. A polyolefin resin composition consisting essentially of a mixture of 100 parts by weight of a polyolefin resin with (a) 0.01-3.0 parts by weight of an antiblocking agent, the surface OH group content of which is 200 μmol/g or less, (d) 0.01-3.0 parts by weight of a phenol type antioxidant selected from the group consisting of tris(3,5-di-t-butyl-4-hydroxybenzyl)isocyanurate,2,2'-methylenebis(4-ethyl-6-t-butylphenol),n-octadecyl-3-(3',5'-di-t-butyl-4'-hydroxyphenol) propionate, 4,4'-thio-bis(3-methyl-6-t-butylphenol), 4,4'-butylidenebis(3-methyl-6-t-butylphenol),2,2'-methylenebis(4-methyl-6-t-butylphenol),N,N,'-hexamethylenebis(3,5-di-t-butyl-4-hydroxyhydrocinnamide), triethylene glycol-bis[3-(3'-t-butyl-5'-methyl-4-hydroxyphenyl propionate] and a mixture of bis(ethyl 3,5-di-t-butyl-4-hydroxybenzyl-phosphate) calcium and PE wax having a weight ratio of 1:1, and (e) 0.01 to 0.2 parts by weight of a phosphite antioxidant, wherein the cumulative amount of acids having a solid acid acidity pKa or 4.8 or less on the surface of the antiblocking agent is 250 μmol/g or less.

2. A method of improving a thermal stability and a discoloration resistance of a polyolefin resin composition which comprises adding (a) 0.01-3.0 parts by weight of an antiblocking agent, the surface OH group content of which is 200 μmol/g or less, (d) 0.01-3.0 parts by weight of a phenol type antioxidant selected from the group consisting of tris(3,5-di-t-butyl-4-hydroxybenzyl) isocyanurate, 2,2'-methylenebis(4-ethyl-6-t-butylphenol), n-octadecyl-3-(3',5'-di-t-butyl-4'-hydroxyphenol) propionate, 4,4'-thio-bis(3-methyl-6-t-butylphenol), 4,4'-butylidenebis(3-methyl-6-t-butylphenol), 2,2'-methylenebis(4-methyl-6-t-butylphenol), N,N'-hexamethylenebis(3,5-di-t-butyl-4-hydroxyhydrocinnamide), triethylene glycol-bis[3-(3'-t-butyl-5'-methyl-4-hydroxyphenylpropionate] and a mixture of his(ethyl 3,5-di-t-butyl-4-hydroxybenzylphosphate) calcium and PE wax having a weight ratio of 1:1, and (e) 0.01 to 0.2 parts by weight of a phosphite antioxidant to a mixture of 100 parts by weight of the polyolefin resin, wherein the cumulative amount of acids having a solid acid acidity pKa or 4.8 or less on the surface of the antiblocking agent is 250 μmol/g or less.

3. A polyolefin resin composition according to claim 1, wherein the phosphite antioxidant (e) is selected from the group consisting of trimethyl phosphite, tri-n-butyl phosphite, tridecyl phosphite, tris(2-ethylhexyl) phosphite, trinonyl phosphite, tricetyl phosphite, dilauryl hydrogenphosphite, tricyclohexyl phosphite, triphenyl phosphite, tribenzyl phosphite, tricresyl phosphite, tri-p-nonylphenyl phosphite, tris(2,4-di-t-butylphenyl) phosphite, tris(4-α-methylbenzylphenyl) phosphite, tris(octylthioethyl) phosphite, tris(octylthiopropyl) phosphite, tris(cresylthiopropyl) phosphite, tris(3,5-di-t-butyl-4-hydroxyphenyl) phosphite, tetraphenyldipropyl glycol diphosphite, 4,4'-butylidenebis(3-methyl-6-t-butylphenylditridecyl) phosphite, 1,1,3-tris(2-methyl-4-ditridecyl phosphite-5-t-butylphenyl)butane, bis(2-chloropropyl)pentaerithritol diphosphite, bisstearylpentaerithritol diphosphite, trilauryl trithiophosphite and tetrakis(2,4-di-t-butylphenyl)-4,4'-biphenylene diphosphite.

4. A method of claim 2, wherein the phosphite antioxidant (e) is selected from the group consisting of trimethyl phosphite, tri-butyl-phosphite, tridecyl phosphite, tris(2-ethylhexyl) phosphite, trinonyl phosphite, tricetyl phosphite, dilauryl hydrogenphosphite, tricyclohexyl phosphite, triphenyl phosphite, tribenzyl phosphite, tricresyl phosphite, tri-p-nonylphenyl phosphite, tris(2,4-di-t-butylphenyl) phosphite, tris(4-α-methylbenzylphenyl) phosphite, tris(octylthioethyl) phosphite, tris(octylthiopropyl) phosphite, tris(cresylthiopropyl) phosphite, tris(3,5-di-t-butyl-4-hydroxyphenyl) phosphite, tetraphenyldipropyl glycol diphosphite, 4.4'-butylidenebis(3-methyl-6-t-butylphenyl-tridecyl) phosphite, 1,1,3-tris(2-methyl-4-ditridecyl phosphite-5-t-butylphenyl)butane, bis(2-chloropropyl)pentaerythritol diphosphite, bisstearylpentaerythritol diphosphite, trilauryl trithiophosphite and tetrakis(2,4-di-t-butylphenyl)-4,4'-biphenylene diphosphite.

* * * * *